May 18, 1965  T. J. MANNING, JR  3,183,592
TOOL FOR REMOVING DEFECTS FROM THE PROPELLANT
GRAIN OF A SOLID PROPELLANT ROCKET MOTOR
Filed Jan. 13, 1964  2 Sheets-Sheet 1

Thomas J. Manning Jr. INVENTOR.

BY

ATTORNEY

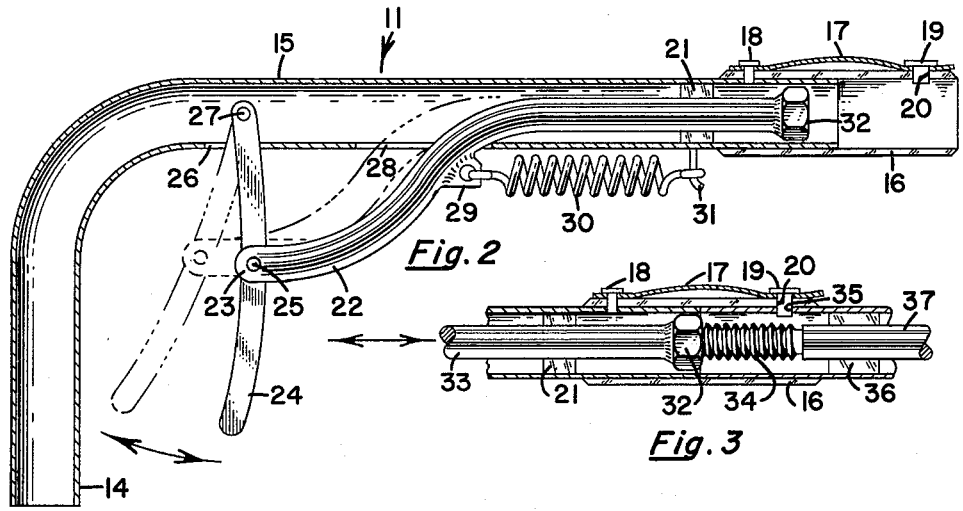
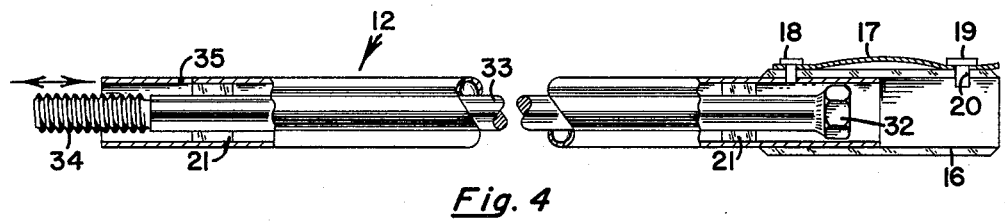
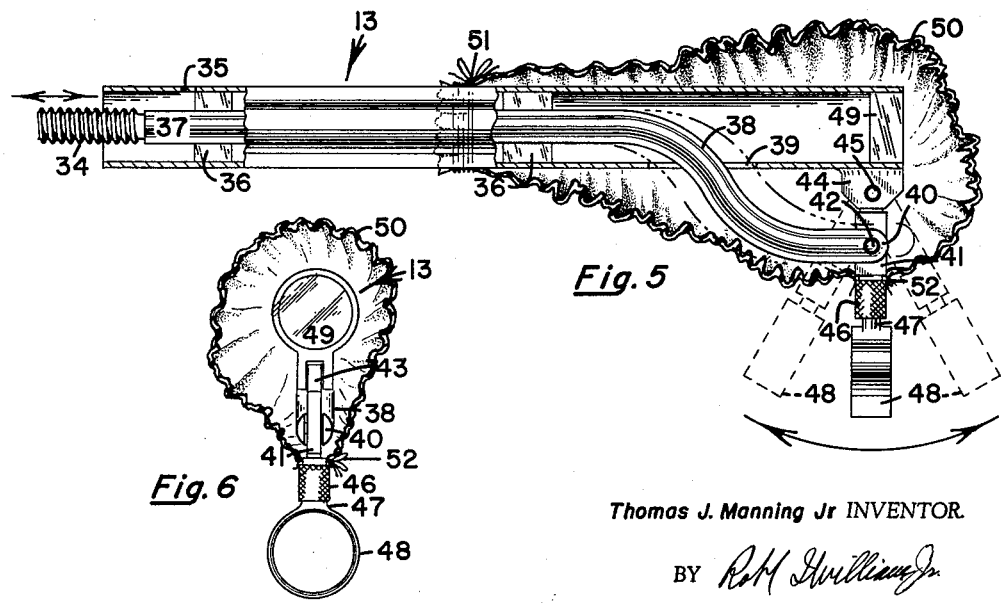
Thomas J. Manning Jr INVENTOR

United States Patent Office 3,183,592
Patented May 18, 1965

3,183,592
TOOL FOR REMOVING DEFECTS FROM THE PROPELLANT GRAIN OF A SOLID PROPELLANT ROCKET MOTOR
Thomas J. Manning, Jr., Huntsville, Ala., assignor to Thiokol Chemical Corporation, Bristol, Pa., a corporation of Delaware
Filed Jan. 13, 1964, Ser. No. 337,249
1 Claim. (Cl. 30—169)

This invention relates to a tool for removing defects from a propellant grain that occur during the casting process or those that later develop after the casting of a solid propellant rocket motor.

One of the more important design criteria for a tool of this type is safety. Because of the hazardous nature of the operation, since it is performed on a relatively large mass of easily ignitable propellant, the use of high speed rotating elements, gears, chains and sprockets, and other similar components is precluded. This tool is designed for the highest degree of flexibility, while maintaining its safe operating characteristics at the maximum.

Utilizing available tooling, the removal of defects, such as cracks, voids, etc., from the solid propellant grain was time-consuming and strenuous. This was especially true when the propellant grain was for a large solid propellant rocket and the defects were located near or forward of the center of the solid propellant grain.

The available tooling was bulky and clumsy to handle making the cutting operations that were necessary to remove the defects very difficult. The working space in the cavity configuration is usually very limited; and thus the necessary cutting operations were difficult and tedious to carry out. In the previously-available cutting head, the ring or cutting knife carried thereby was stationary; and it was, therefore, difficult to remove the cutting knife from the solid propellant grain after the cut was initiated.

It is an object of this invention, therefore, to provide a tool of this type that is compact, light in weight, and can be easily maneuvered to cut the defects from the solid propellant grain.

It was also found to be necessary that the tool could be easily operated by one man within a limited work space. The tool had to include an adjustable cutting head that would permit the cutting knife to be easily removed from the solid propellant grain after the cut had been initiated.

Further, the tool had to be of a type that could be varied in size according to the size of the solid propellant grain and yet be easily transported from one location to another with ease and without the aid of any means of transportation.

The tool must also require a small storage space when not in use; but the main feature of the tool had to be the saving of time in the removing of the defects from the solid propellant grain.

It is, therefore, a further object of this invention to provide a tool that will meet all the requirements previously set forth and, at the same time, be economical to manufacture and susceptible of easy replacement when damaged to any extent.

With the above and other objects and advantages in view, the invention consists of the novel details of construction, arrangement, and combination of parts more fully hereinafter described, claimed, and illustrated in the accompanying drawings in which:

FIGURE 2 is a longitudinal sectional view, partly in elevation, of the handle and control section of the tool.

FIGURE 3 is a diagrammatic sectional view showing the manner in which the sections of the tool are joined together.

FIGURE 4 is an elevational view, partly in section and partly broken away, of one of the intermediate sections of the tool.

FIGURE 5 is an elevational view, partly in section, of the cutting head section and cutting knife of the tool, and FIGURE 6 is an end view of the section of the tool shown in FIGURE 5.

Figure 1:
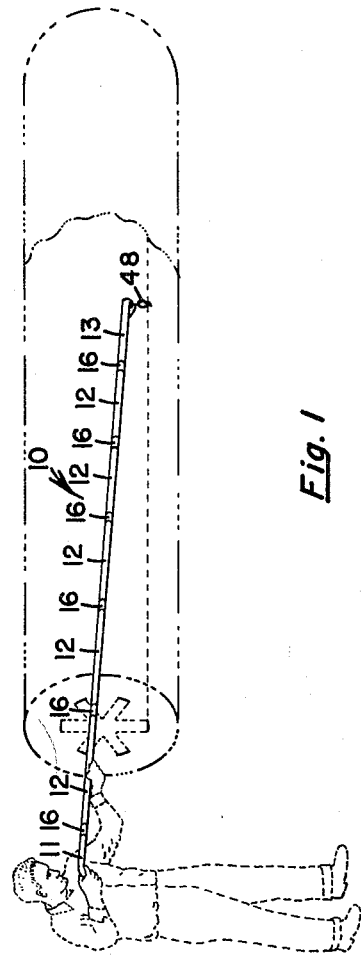
FIGURE 1 is a schematic view showing the manner of operation of a tool embodying the invention.

Referring more in detail to the drawings wherein like parts are designated by like reference numerals, the reference numeral 10 is used to generally designate a tool embodying the invention.

The tool 10 comprises several sections, a handle and control section 11 (FIGURE 1), one or more intermediate sections 12 (FIGURE 4), and a cutting head section 13 (FIGURE 5).

The handle and control section 11 is made from tubular stock which is formed to have a grip portion 14 and a straight portion 15. Secured to the free end of the straight portion 15 is a tubular socket 16 which has a spring latch 17 secured thereto at one end by a fastener 18. The free end of the latch 17 has a dog 19 secured thereto which extends into the socket 16 by means of an opening 20 therein.

Inwardly of the open end of the straight portion 15 of the handle and control section 11, there is positioned a bearing bushing 21; and slidably mounted therein at one end thereof is a serpentine-shaped control rod 22. The rod 22 has a bifurcated inner end 23 which receives a curved control lever 24. The end 23 being pivotally connected to the lever 24 at approximately the median portion thereof by means of a pivot pin 25. One end of the lever 24 extends into the straight portion 15 through an elongated slot 26 in the undersurface of the straight portion 15; and this end is pivotally connected to the straight portion 15 by a pivot pin 27. The lever 24 is oscillated on the pivot pin 27 to reciprocate the rod 22 and movement of the rod 22 is permitted by means of a second elongated slot 28 in the undersurface of the straight portion 15 adjacent to the first slot 26.

Outwardly of the slot 28 in the straight section 15, the rod 22 is provided with an apertured boss 29 which receives one end of a coil spring 30, the opposite end of which is connected to a retaining pin 31 that is secured to the undersurface of the straight portion 15 in vertical alignment with the bushing 21. The free end of the rod 22 is provided with an internally-threaded socket 32 whereby the rod 22 may be connected to the other sections of the tool 10 as will be later described.

The intermediate section 12 may be of any desired length; and as many of these sections may be used as is necessary to reach all the defects that might have occurred in the surface of the cavity configuration of the propellant grain.

The intermediate section 12 is also formed from tubular stock and may have a plurality of bearing bushings 21 mounted therein. An extension rod 33 is slidably mounted in the bushings 21 and may be connected to the socket 32 on the rod 22 by means of a threaded end portion 34. The opposite end of the extension rod 33 has a socket 32 thereon which is identical with the socket 32 on the end of the rod 22. The section 12 is provided at one end with an aperture 35 to receive the dog 19 on the latch 17 that is secured to the socket 16 on the handle and control section 11; and the section 12 has a similar socket 16 connected to the opposite end thereof which includes the latch 17 that is secured to the socket 16 by the fastener 18 and the dog 19 that is secured to the latch 17 and extends through the opening 20 in the socket 16.

The cutting head section 13 may also be of any length and is also formed of tubular stock. A plurality of bearing bushings 36 are mounted in the cutting head section 13 and an extension rod 37 is slidably mounted in the bushings 36 and may be connected to the socket 32 on the rod 22 or the socket 32 on the extension 33 by means of a threaded end portion 34. The opposite end of the extension rod 37 has a serpentine-shaped portion 38 which extends in reverse relation to the rod 22 and also extends through an elongated slot 39 in the undersurface of the section 13. The end of the portion 38 is bifurcated, as at 40, to receive a cutting head 41 that is pivotally connected to the bifurcated end 40 by means of a pivot pin 42. One end of the cutting head 41 has a reduced portion 43 which is pivotally mounted in a bifurcated boss 44 on the undersurface of the section 13 by means of a pivot pin 45. The cutting head 41 has a collet chuck 46 on the free end thereof to receive a coupling end 47 of a ring knife 48. The bearing bushings 36 are somewhat larger than the bearing bushings 21 and a plug 49 is inserted into the open free end of the section 13.

A protective sleeve 50 made of a durable pliable plastic is slipped over the forward end of the section 13 and a draw string 51 retains one end thereof about the section 13 while a draw string 52 retains the other end thereof about the cutting head 41. The sleeve 50 protects the moving parts of the section 13 from contamination by the propellant grain that is cut out by the ring knife 48 and also prevents any transmission of heat that may be caused by friction between the moving parts of the section 13. Thus the sleeve 50 functions as a safety factor during the removal of the defects from the propellant grain.

After a visual inspection of the cavity configuration of the propellant grain and the defects that have to be corrected have been located, the tool 10 is assembled so that it assumes its operable condition, as shown in FIGURE 1. Means for illuminating the cavity configuration are provided while the tool 10 is being manipulated; but since such means does not affect the present invention, such means has not been included in the schematic view shown in FIGURE 1.

Since the tool 10 is made of a light durable metal or a light durable plastic, it can be easily handled by one man; and by manipulating the lever 24, the ring knife 48 may be made to oscillate, as shown in FIGURE 5, and cut into the propellant grain to remove the defects therefrom. The bearing bushings 21 and 36 are made from a suitable plastic and there is sufficient clearance between all of the moving parts of the tool 10 so that there is no chance of heat being caused by friction or any chance of static electricity being caused by the operation of the tool 10.

It is believed, therefore, that, from the foregoing description, the manner of construction of the tool as well as its manner of operation will be clear to those skilled in the art; and it is to be understood that variations in the details of construction of the tool may be adhered to provided such variations fall within the spirit of the invention and the scope of the appended claim.

Having thus described the invention, what is claimed as new and desired to be secured by Letters Patent is:

A tool for removing defects from a solid propellant grain comprising a plurality of inter-connected tubular sections having a handle control section at one end and a cutting head section at the opposite end, a control lever pivotally mounted in said handle control section, a cutting head pivotally mounted in said cutting head section, a cutting knife mounted in said cuting head, a socket on the free end of said handle control section receiving one end of the next adjacent tubular section, the free end of said next adjacent tubular section having a socket thereon receiving the free end of said cutting head section to connect said handle control section, said cutting head section and said next adjacent tubular section in inter-connected relation to each other, a spring latch having a dog on one end secured to each of said sockets so that, when said tubular sections are in inter-connected relation to each other, the dog on said spring latch will enter an opening provided in the next adjacent tubular section to retain said tubular sections in rigid relation to each other, sectional means including a rod in each of said tubular sections having an internally-threaded socket on one end and an externally-threaded portion on the opposite end, said threaded portions being received in said internally-threaded sockets to inter-connect said sectional means together in rigid relation to each other, a first serpentine-shaped control rod having one end thereof pivotally connected to said control lever and the opposite end thereof rigidly connected to one end of said sectional means, a second serpentine-shaped control rod having one end thereof pivotally connected to said cutting head and the opposite end thereof rigidly connected to the opposite end of said sectional means, said sectional means and said serpentine-shaped control rods connecting said control lever to said cutting head so that manual operation of said control lever will actuate said cutting head to reciprocate said cutting knife in arcuate relation to the longitudinal axis of said tool, and a plastic sleeve having draw strings in the opposite ends thereof secured to and covering said cutting head section to prevent contamination of said cutting head by the solid propellant grain.

References Cited by the Examiner

UNITED STATES PATENTS

| | | | |
|---|---|---|---|
| 350,186 | 10/86 | Comptom | 30—272 |
| 1,256,402 | 2/18 | Ware | 15—249 |
| 1,608,332 | 11/26 | McShirley et al. | 15—249 |
| 1,697,088 | 1/29 | Reed | 30—166 |
| 2,236,955 | 4/41 | Thompson | 30—248 |
| 2,549,280 | 4/51 | Allen | 30—242 X |

FOREIGN PATENTS 564,459    6/57    Italy.

WILLIAM FELDMAN, *Primary Examiner.*

MILTON S. MEHR, M. HENSON WOOD, Jr.,
*Examiners.*